(12) United States Patent
Beardsley et al.

(10) Patent No.: US 6,431,556 B1
(45) Date of Patent: Aug. 13, 2002

(54) GOLF CART TOWING DEVICE

(76) Inventors: Jack D. Beardsley, 659 North Burns, Valley Center, KS (US) 67147; Lee R. Epley, 11805 Madison Ave., Kansas City, MO (US) 64114

(*) Notice: Subject to any disclaimer, the term of this patent is extended or adjusted under 35 U.S.C. 154(b) by 0 days.

(21) Appl. No.: 09/656,632

(22) Filed: Sep. 7, 2000

(51) Int. Cl.$^7$ ................................................ B62D 51/04
(52) U.S. Cl. ............ 280/1.5; 280/47.131; 280/DIG. 6; 224/184; 224/666
(58) Field of Search .............................. 280/1.5, 47.131, 280/DIG. 6, DIG. 11, 24, 19, 204, 292, 298; 224/184, 197, 660, 666, 668; 248/230.3, 231.41, 292.12, 221.11, 222.3, 74.4, 218.4, 219.4

(56) References Cited

U.S. PATENT DOCUMENTS

| | | | |
|---|---|---|---|
| 2,559,981 A | | 7/1951 | McBride |
| 2,726,875 A | * | 12/1955 | Murcott ...................... 280/645 |
| 2,791,436 A | * | 5/1957 | Wuerthner ................... 280/38 |
| 2,957,700 A | * | 10/1960 | Beaurline ................ 280/47.19 |
| 3,311,385 A | | 3/1967 | Frantz |
| 3,926,448 A | | 12/1975 | Reichard |
| 4,236,723 A | | 12/1980 | Lemmon |
| 5,215,318 A | | 6/1993 | Capraro |
| 5,242,178 A | * | 9/1993 | Galasso et al. ............. 280/204 |
| 5,244,217 A | | 9/1993 | Kotulla |
| 5,375,861 A | | 12/1994 | Gifford |
| 5,482,304 A | | 1/1996 | Smith |
| 5,622,294 A | | 4/1997 | Evans |
| 5,653,455 A | | 8/1997 | Richards |
| 5,901,968 A | | 5/1999 | Niedersteiner |
| 6,131,917 A | * | 10/2000 | Walsh ........................ 280/43.1 |
| 6,152,465 A | * | 11/2000 | Shieh .......................... 280/62 |

* cited by examiner

*Primary Examiner*—Daniel G. DePumpo
(74) *Attorney, Agent, or Firm*—Chase Law Firm, L.C.

(57) ABSTRACT

A golf cart towing device includes a bracket assembly which is selectably attached along a tongue of a golf cart and adjustable to fit cart tongues of various breadth. A connector rod is angularly adjustable relative to the handle and includes a hook end for engaging an eyelet extending from a belt worn by the golfer. A releasable latch on the hook end maintains the hook end within the eyelet. The various adjustments of the bracket and/or the connector rod allow the golf cart to be effectively towed by persons of differing statures/physiques.

20 Claims, 7 Drawing Sheets

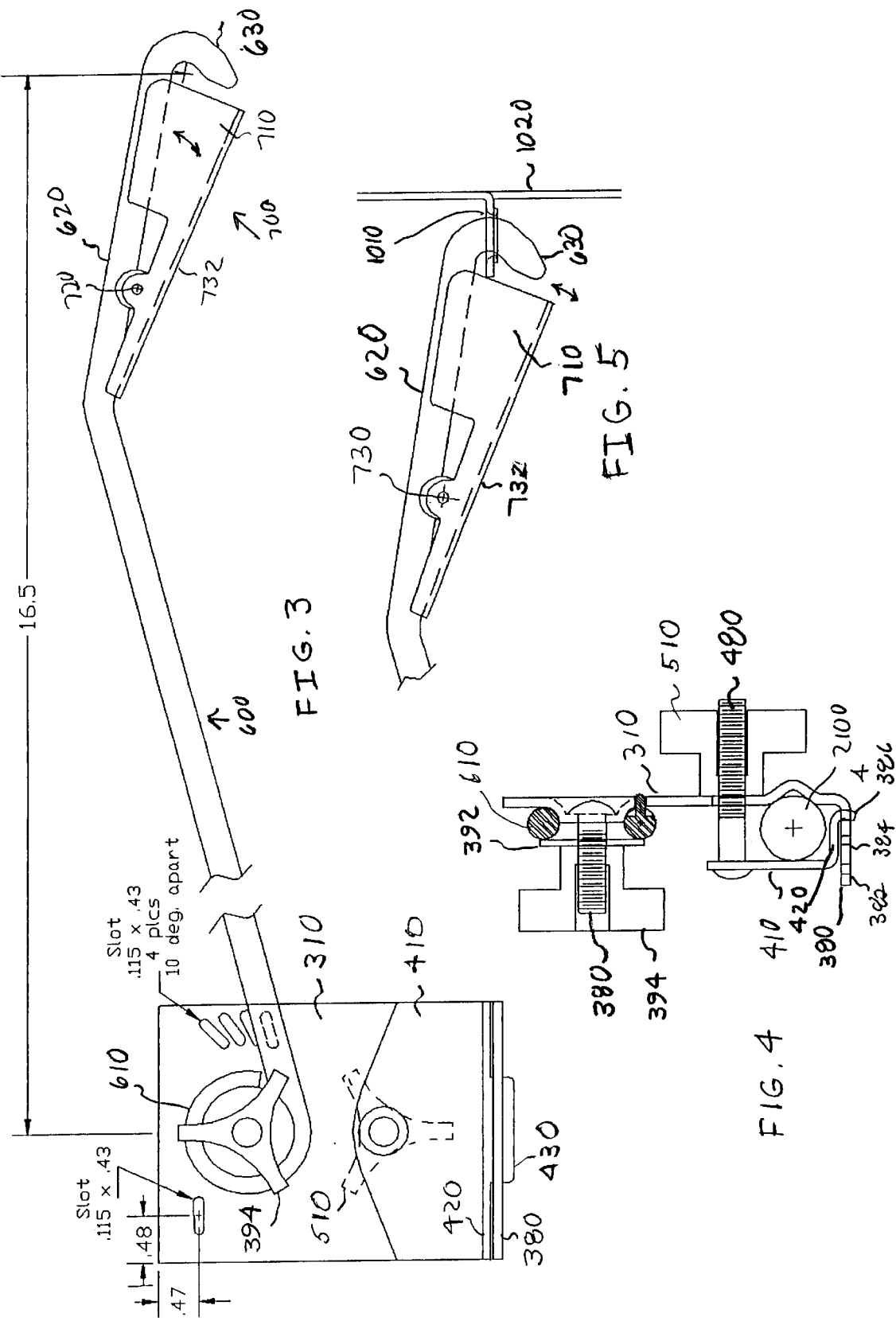

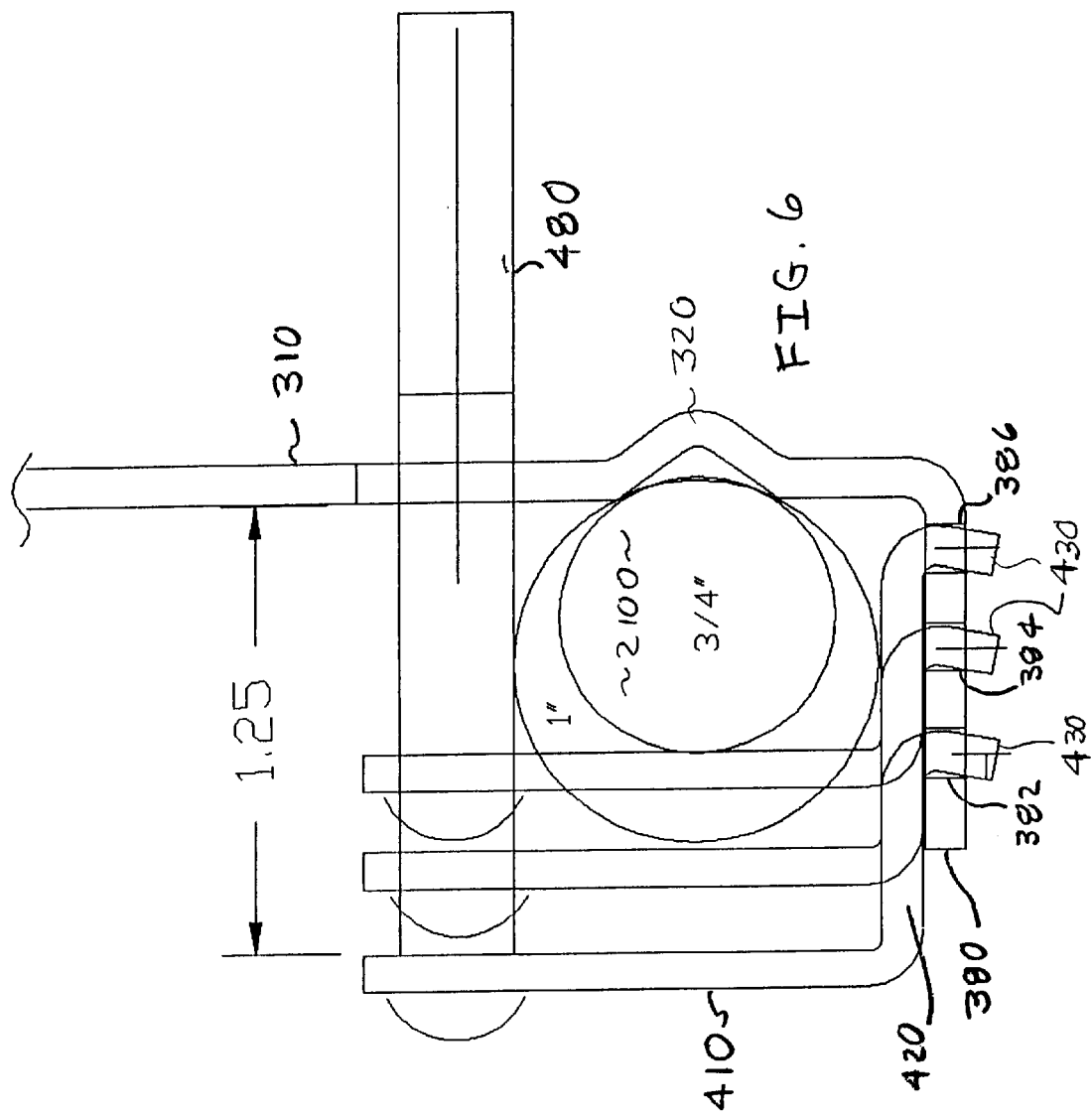

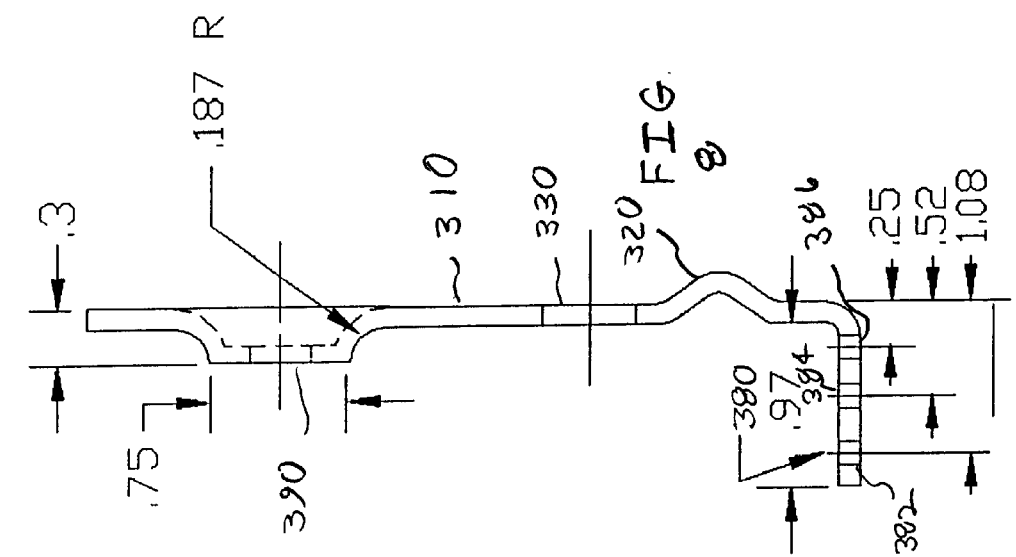
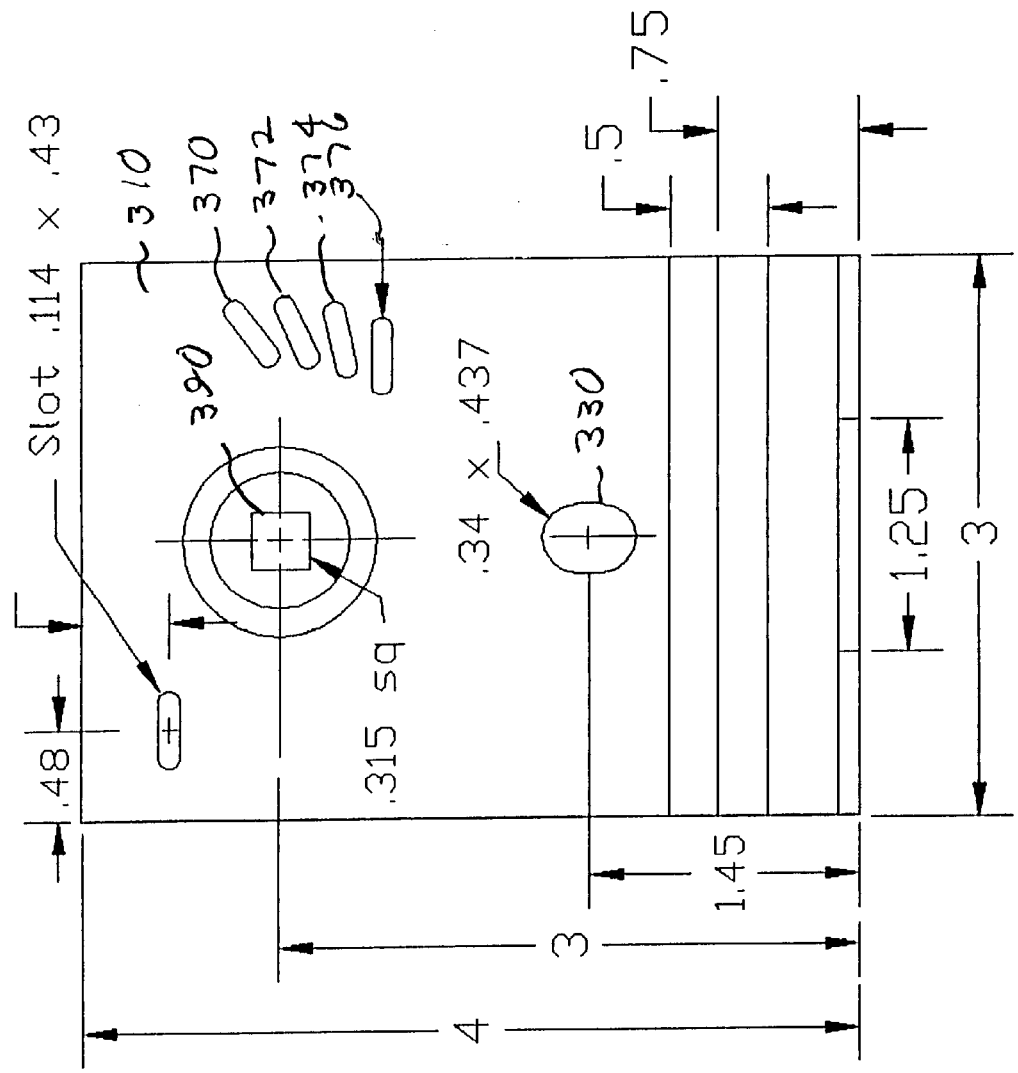
FIG. 7

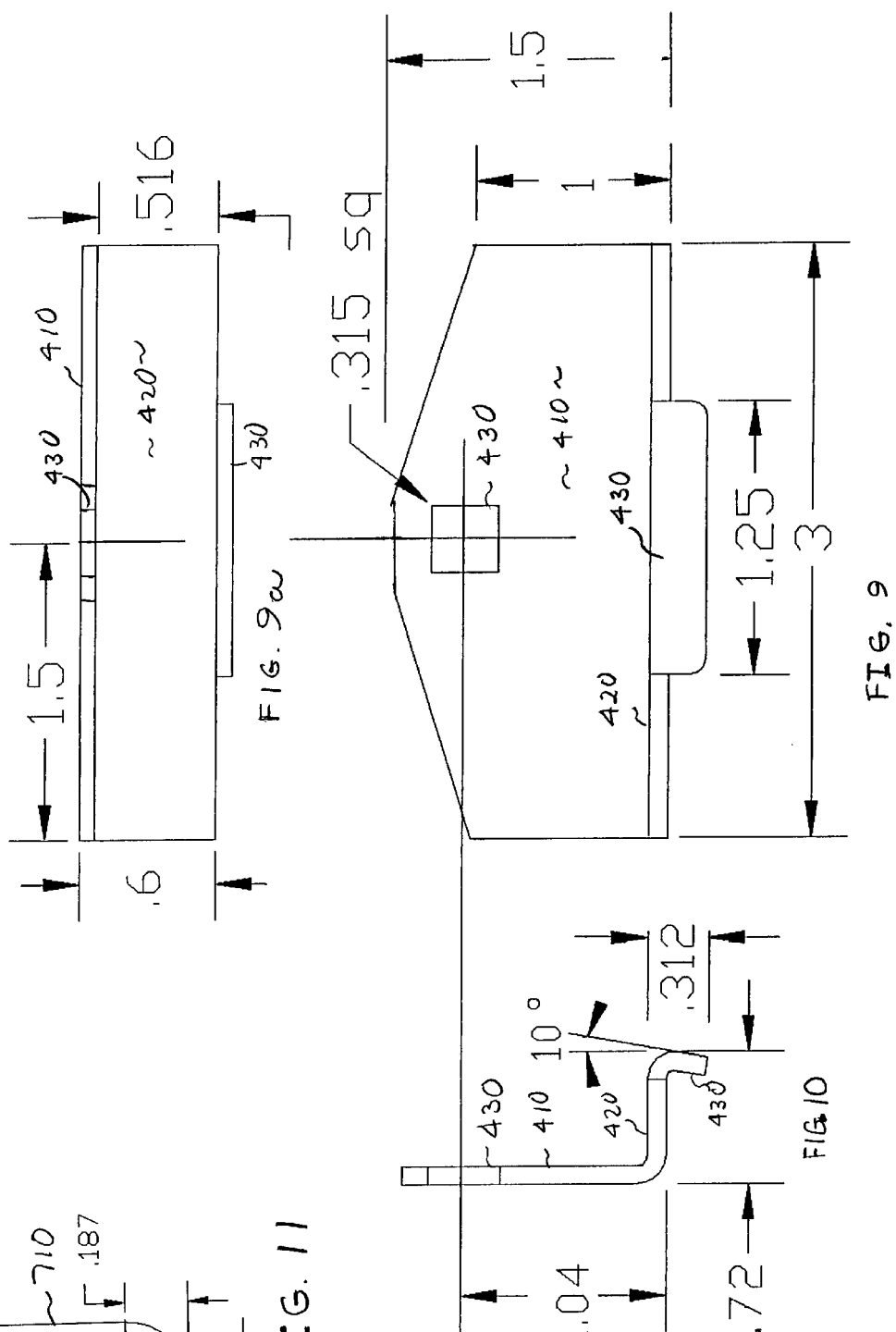

GOLF CART TOWING DEVICE

BACKGROUND OF THE INVENTION

This invention relates to a golf cart towing device and, more particularly, a connection assembly which is longitudinally and angularly adjustable, relative to a handle of a golf cart, so as to effectively couple a golf cart to a user.

Many players use a two-wheeled golf cart to avoid the fatigue associated with carrying a golf bag. In response thereto, various linkage devices have been proposed for enabling the golfer to tow a cart about the course.

However, past devices have not provided an effective structure for achieving such a coupling function. Past devices were not able to vary the location and/or angle of attachment of a connector along the cart handle so as to address the particular stature/physique of the golfer. Absent such relative adjustments the golf cart may either be too close or too far from the golfer and the angle of connection may not comfortably shift the load to the golfer. Also, prior devices interfered with the natural ambulatory movement of the golfer and/or did not effectively allow the golfer to use the larger torso, hip and leg muscles to tow the golf cart. In some cases the hand pulling of the golf cart causes fatigue, cramping and tension in the fingers, wrist, forearm and elbow which may affect the golfer's swing.

In response thereto we have invented a device which releasably connects a cart to a golfer so that the golfer can efficiently use the stronger torso, hip and leg muscles to pull the cart. Our device includes a coupling structure releasably connected at one end along a selected position along the golf cart handle/tongue and at the other end to a wide, flexible belt which encircles the waist of the golfer.

Our connector assembly includes a bracket assembly which can be selectably clamped along the handle/tongue of the golf cart and an elongated connector rod which can be selectably extended from the bracket at a user selectable angle. The rod has a free end with a latch thereon which releasably engages an eyelet extending from a rear of the belt. The selectable position of the bracket along the tongue enables the golfer to adjust the distance that the connector rod extends beyond the golf cart and thus the distance between the user and the towed cart. The connector rod is pivotal which enables the golfer to adjust the angle of extension of the connector rod from the bracket and between the golf cart handle and golfer. The features allow the connection to, be adjusted according to the stature/physique of the golfer. The end of the pivotal connector rod is releasably latched to the belt eyelet and is easily released therefrom. As such the pulling forces are transferred to the larger muscles which reduces the associated cramps, aches and other pains associated with hand pulling a golf cart, the elimination of which precludes interference with a golfer's grip and subsequent swing.

It is therefore a general object of the invention to provide an enhanced golf cart towing device.

Another object of this invention is to provide a device, as aforesaid, which includes a bracket assembly which is selectably attached along a tongue of a golf cart.

A further object of this invention is to provide a bracket assembly, as aforesaid, which includes a pivotal connector rod having a free end for latching to an eyelet extending from a belt worn by the golfer.

Another object of the invention is to provide a bracket, as aforesaid, wherein the rod is pivotal to a selectable angular position relative to the bracket and maintained thereat.

A particular object of this invention is to provide a device, as aforesaid, which presents a releasable latch assembly at the free end of the rod to preclude separation of the connector rod from the golfer's belt during ambulatory movement.

Another particular object of the invention is to provide a bracket assembly, as aforesaid, which is adjustable according to the handle diameters to which the bracket is attached.

Other objects and advantages of this invention will become apparent from the following description taken in connection with the accompanying drawings, wherein is set forth by way of illustration and example, a now preferred embodiment of our invention.

BRIEF DESCRIPTION OF THE DRAWINGS

FIG. 3 is a side view of the bracket assembly, the foreshortened pivotal connector rod and the latching assembly at the free end of the connector rod;

FIG. 4 is an end view of the bracket showing the interrelationship of the bracket assembly with a handle of the golf cart and the knob/bolt tightening combinations associated therewith;

FIG. 5 is a fragmentary view showing the latching of the free end of the connector rod to the eyelet on the belt worn by the golfer;

FIG. 6 is a diagrammatic end view of the bracket on a large scale showing the various displacements between the bracket walls according to diameters of a golf cart handle;

FIG. 7 is a side view of one of the clamping walls of the bracket;

FIG. 8 is an end view of the wall of FIG. 7;

FIG. 9 is a side view of the opposed clamping wall of the bracket;

FIG. 9*a* is a top view of the FIG. 9 wall;

FIG. 10 is an end view of the second clamping wall of FIG. 9;

FIG. 11 is an end view of the FIG. 5 latch at the free end of the connector rod;

DESCRIPTION OF THE PREFERRED EMBODIMENT

Figure 1:
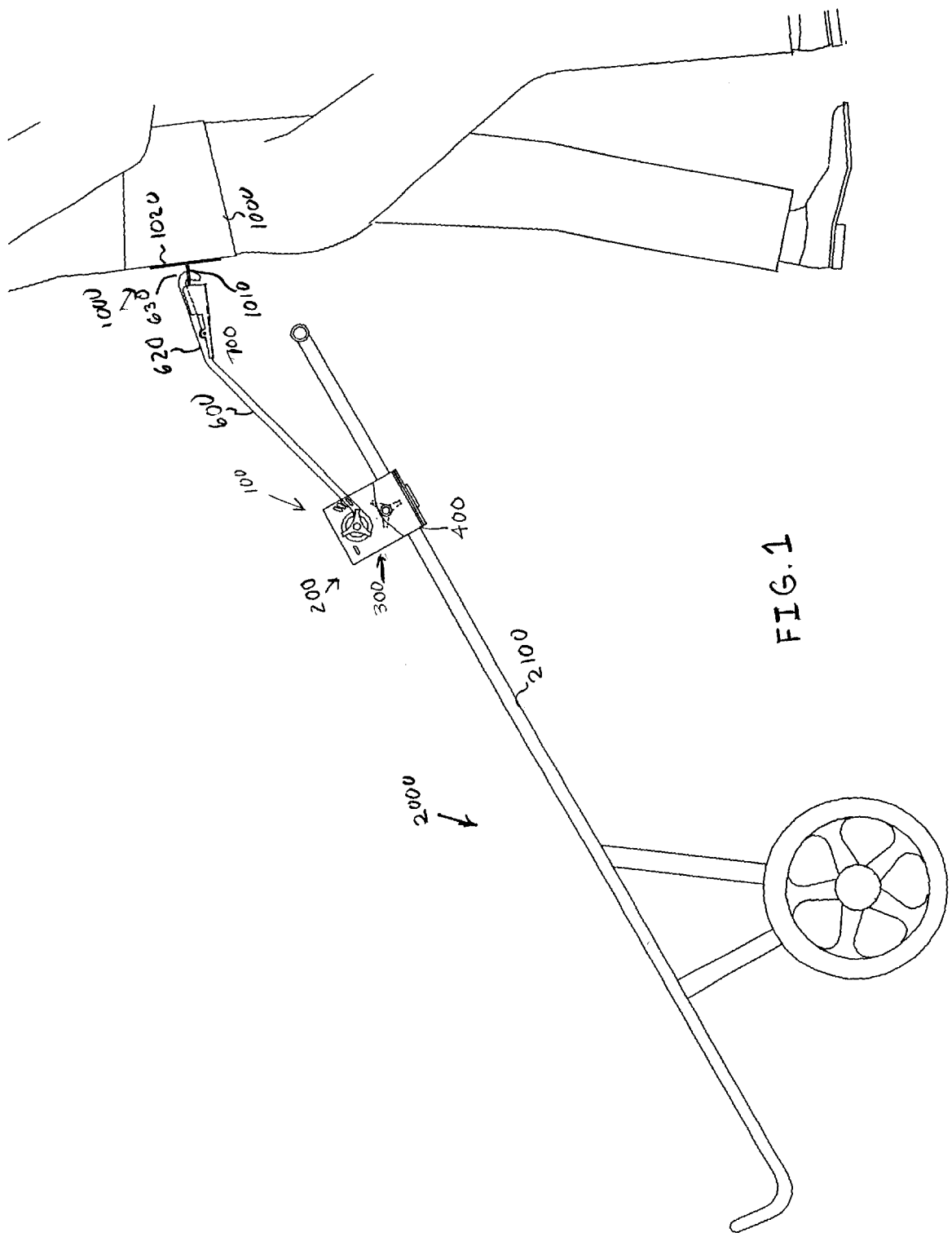
FIG. 1 is a diagrammatic view showing the attachment of the golf cart towing device to a tongue of a golf cart and to the user.

Turning more particularly to the drawings, FIG. 1 shows a now preferred embodiment of our towing device 100 including the bracket assembly 200 attached to the tongue 2100 of a wheeled golf cart 2000. A connector rod 600 extends from the bracket assembly 200 and is attached to an. eyelet 1010 extending from a plate 1020 affixed to the flexible belt 1000 worn by the golfer.

Figure 2:
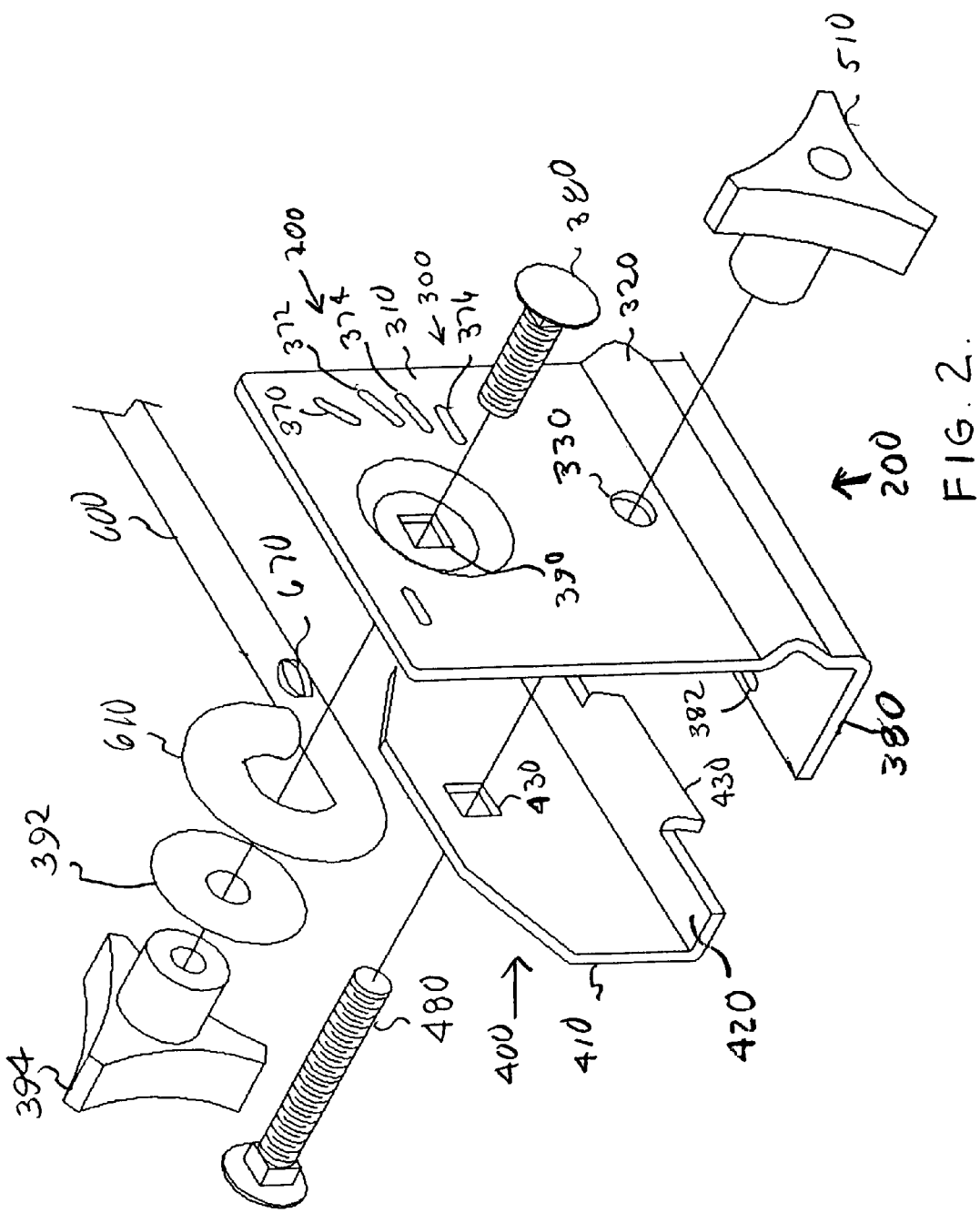
FIG. 2 is an exploded view of the bracket assembly of the towing device and the foreshortened connector rod.
Figure 12:
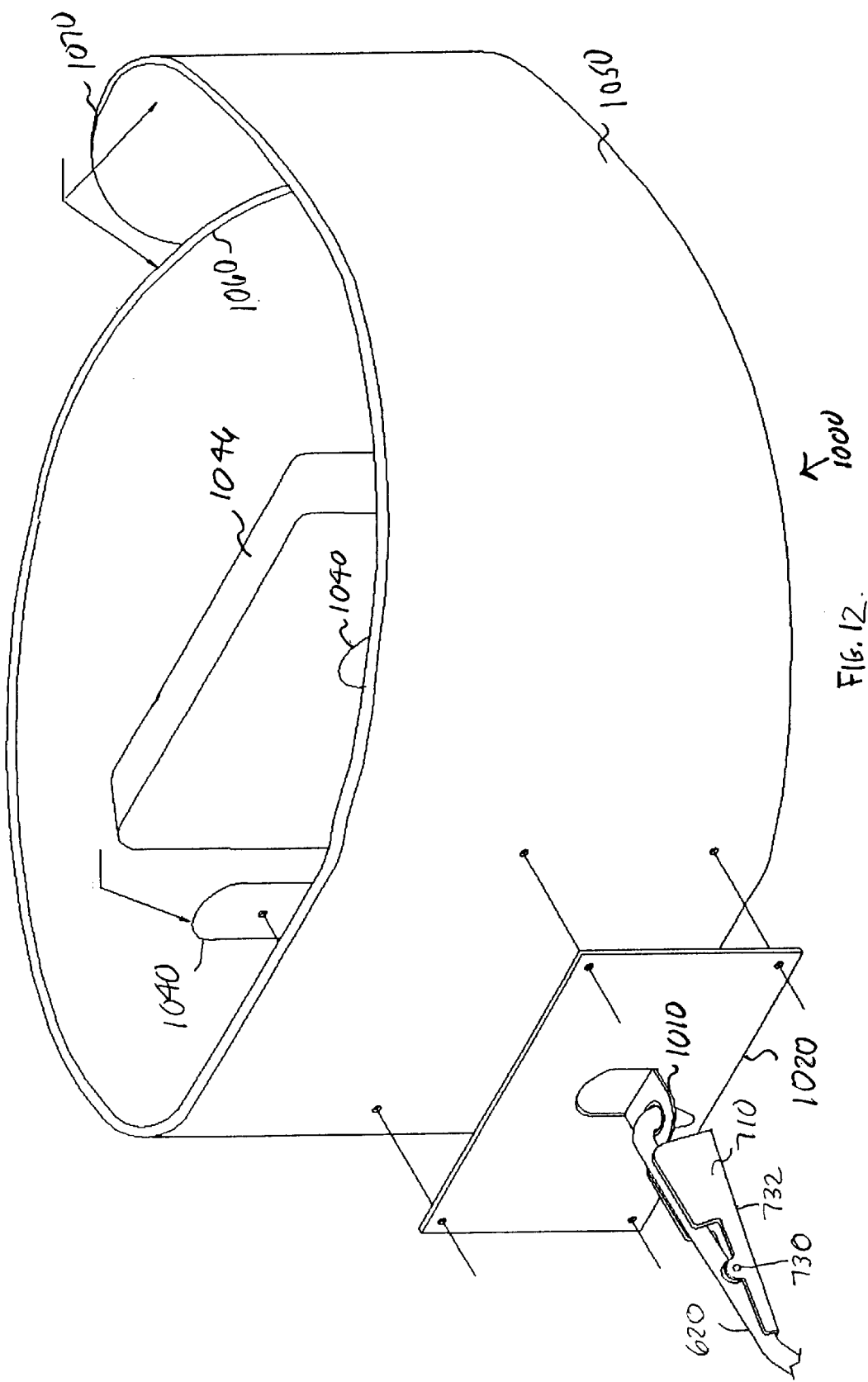
FIG. 12 is an exploded view of the belt and eyelet assembly associated with the belt of the golf cart towing device.

As shown in FIG. 2, the bracket 200 includes a first clamp wall 300 presented by a first upstanding wall 310 with a generally horizontal base 380 extending therefrom. The bottom of wall 310 is recessed 320 to seat a portion of a golf cart handle 2100 therein with wall 380 extending along the underside of the seated handle 2100. An opposed second clamp wall 400 includes an upstanding side wall 410, horizontal base 420 and a depending tab 430. Within wall 310 is an aperture 330 for alignment with aperture 430 in wall 410. The aligned apertures 330, 430 receive a threaded bolt 480 therethrough with the free end of bolt engaging a threaded tightening knob 510.

As shown in FIGS. 4, 6, 8 the base 380 includes three parallel slots 382, 384, 386 which selectably receive depending tab 430 therein as shown in FIGS. 4, 6.

As shown in FIGS. 4, 6 the wall 310 of clamp 300 is positioned on one side of golf cart tongue 2100 with base 380 on the underside thereof. The wall 410 is positioned on the opposed side of tongue 2100 with base 420 on the underside thereof and superiorly adjacent base 380. Tab 420 seats within one of the slots 382, 384, 386 according to the diameter (e.g., ¾"–1¼") of the tongue 2100. Thus, the bracket walls 310, 410 may be spaced and maintained thereat according to the breadth of handle 2100. Subsequently, bolt 480 is inserted through the aligned apertures 330, 430 and tightened by knob nut 510 to clamp handle 2100 therebetween. This bracket assembly 200 is slidable along tongue 2100 by loosening the bolt 480/nut 510 combination and then tightened which maintains the bracket assembly 200 at a selectable position therealong.

Further included in wall 310 is an aperture 390 for reception of a bolt 380 therethrough. Bolt 380 extends through the aperture 390 and a loop/eye 610 formed at a first end of rod 600. A washer 392 and threaded knob nut 394 is positioned on an opposed side of eye 610. Bolt 380 thus presents a pivot pin for the end 610 of rod 600. Rod 600 may then be positioned between a storage position in which it entirely extends along the handle 2100 and the towing position as it extends beyond the handle 2100 end and towards a golfer as shown in FIG. 1. A tightening of the bolt 380/nut 394 combination urges washer 392 against the rod 600 end and against the wall 310 which precludes further pivotal movement of rod 600.

Additionally, to maintain the rod 600 at a selected extension, a series of slots 370, 372, 374, 376 in wall 310 selectively engage a tab 670 extending from rod 600. Upon seating of tab 670 in one of these slots the knob 394 the rod 600 is maintained at a selectable angular extension relative to bracket 200. One such angle is shown in FIG. 3. Accordingly, the bracket 200 is first slidably adjustable along the longitudinal extension of tongue 2100 with the angular relationship of the rod 600 maintained either by the bolt 380/nut 394 combination, or the tab 670/slot 372–376 combination, or both.

At the opposed free end of rod 600 is an angled portion 620 with hook 630 at the end thereof. The hook 630 is insertable within an eyelet 1010 extending from a plate 1020 on the belt 1000. Along the portion 620 is mounted a pivotal latch 700 in the form of a gravity latch 710 pivotally mounted about a pin 730. As shown in FIG. 5 the gravity latch normally drops to the shown position which precludes the hook 630 from movement without the eyelet 100 during ambulatory movement of the golfer. To remove the hook end 630, the golfer simply exerts pressure on the latch 710 which positions the base 732 thereof adjacent the rod portion 620. This latch allows hook 630 to be removed from eyelet 1010.

Belt 1000 includes a flexible waist-encircling strap 1050 having a Velcro® fastener combination at the overlapping ends 1060, 1070. Attached to the rear end of the belt by rivets or the like is a plate 1020 with the horizontal eyelet 1010 extending therefrom. Stays 1040 are on opposed interior sides of the belt receive the rivet ends with a pad 1046 covering these stays 1040.

In use the bracket 200 is slidably positioned along the tongue 2100 as above described and maintained thereat by tightening the bolt 480/knob 510 combination. This feature adjusts the longitudinal extension of the hook end 630 of the rod beyond the handle 2100 of the cart 200 and thus the distance between the golfer and towed cart. The angle of the rod 600, relative to bracket 200 and tongue 2100, is then adjusted by the above-described rotation of rod 600 about bolt 380, engagement of tab 670 with a selected slot 370, 372, 374, 376, and/or tightening the bolt 380/nut 394 combination. Upon encircling the belt 1000 about the golfer, the hook 630 is insertable into the eyelet 1010. Thus, the distance between the golfer and the towed cart 2000 and the angle of connector rod 600 are adjustable which allows persons of various statures/physiques to comfortably tow golf carts of various designs.

Upon engagement of hook 630 in eyelet 1030, the gravity latch 710 falls into place which precludes separation of the hook 630 from the eyelet 1010 during ambulatory movement of the golfer. Depression of the releasable latch 710 allows the hook 630 to be easily removed from the eyelet 1010. Thus, a golfer easily disengages the rod, 600 from the belt 1000 prior to addressing the golf ball. Alternatively, the golfer can simply remove the entire belt 1000 and subsequently address the ball.

It is to be understood that while certain forms of this invention have been illustrated and described, it is not limited thereto, except in so far as such limitations are included in the following claims.

Having thus described the invention, what is claimed as new and desired to be secured by Letters Patent is:

1. A device for hands free pulling of a cart having a handle grip adjacent the end of a handle shaft, said device comprising:
    a single bracket assembly adapted for slidable movement along the handle shaft, said bracket assembly comprising:
        a first bracket wall;
        a second bracket wall positioned opposite said first bracket wall with the cart handle shaft therebetween; and
    means for clamping said first bracket wall to said second bracket wall with the handle shaft therebetween at a selectable position along the handle shaft;
    an elongated rod having a first end for attachment to said bracket assembly and a second end for extension beyond the handle grip;
    means for pivotally mounting said first rod end in movement about an axis extending through at least one of said bracket walls and in movement therewith whereby to position said second rod end in said extension beyond an end of the handle grip and at a selectable angular relationship relative to the handle shaft;
    a belt adapted to be worn by a user;
    means extending from said belt for receiving said second end of said rod therein, said receiving of said rod second end displacing the cart handle grip from the user with said rod extending therebetween, whereby a movement of the user is transferred from said belt to the cart handle shaft by said rod for towing said cart.

2. The device as claimed in claim 1 further comprising means for maintaining said rod at a selected pivotal relationship about said axis, whereby to adjust the angular relationship of said rod relative to said bracket assembly and the handle shaft attached thereto.

3. The device as claimed in claim 2 wherein said maintaining means comprises:

a plurality of apertures in one of said bracket walls;

a tab on said rod first end selectably engageable with one of said apertures in a manner to preclude further pivotal movement of said rod about said axis.

4. The device as claimed in claim 1 further comprising means at said second end of said rod for maintaining said second rod end in said eyelet.

5. The device as claimed in claim 1 wherein said clamping means comprises:

a bolt extending between said first and second bracket walls;

a nut on an end of said bolt and adjacent one of said bracket walls, a rotation of said nut in a first direction drawing said first bracket wall towards said second bracket wall for said clamping of the handle shaft of the cart therebetween.

6. The device as claimed in claim 1 wherein at least one of said bracket walls includes a recess therein for a seating of the handle shaft therein.

7. The device as claimed in claim 1 wherein the pivot mounting means comprises a bolt extending between at least one of said bracket walls, said bolt extending through said first end of said rod and along said axis.

8. The device as claimed in claim 7 further comprising a nut releasably engaging said bolt, said nut urging said rod first end against one of said bracket walls to resist said pivotal movement of said rod about said axis.

9. The device as claimed in claim 1 further comprising:

a first base extending from said first bracket wall;

a second base extending from said second bracket wall;

a plurality of slots in said first base;

a tab extending from said second base for engaging with a selected one of said slots in said first base upon a position of said first base adjacent said second base, said tab/slot engagement spacing said first bracket wall from said second bracket wall according to a breadth of the handle shaft positioned therebetween.

10. A device for hands free pulling of a cart having a handle portion presenting a grip comprising:

a clamping assembly adapted for slidable movement along a portion of the cart handle, said clamping assembly comprising:

a first wall for slidable positioning along a first side of the portion of the handle;

a second wall opposite said first wall for slidable positioning on an opposed second side of the portion of the handle opposite said first wall;

means for drawing said first wall towards said second wall for clamping the handle portion therebetween;

an elongated rod having first and second ends, said rod having a length adapted for extension of said second rod end beyond the grip presented by the handle portion;

means for pivotally mounting said rod first end about an axis extending through at least one of said walls for adjusting an angular relationship between the rod and the handle;

a belt adapted to be worn by a user;

means on said belt for engaging said second end of said rod extending beyond the handle grip, said rod displacing the handle grip from the user at a selectable distance and angular relationship relative thereto.

11. The device as claimed in claim 10 wherein said engaging means comprises an eyelet for engaging said second rod end.

12. The device as claimed in claim 10 further comprising means for maintaining said rod at a selected angular relationship relative to the axis.

13. The device as claimed in claim 12 wherein said maintaining means comprises:

a plurality of apertures in one of said walls;

a tab on said rod first end selectably engageable with one of said wall apertures in a manner to preclude further pivotal movement of said rod about said axis.

14. A device for hands free pulling of a cart having a longitudinally extending handle shaft presenting a grip at a free end thereof comprising:

a first wall adapted for positioning on a first side of the cart handle shaft;

a second wall opposite said first wall for positioning on an opposed second side of the handle shaft;

means for maintaining said first bracket wall against said second bracket wall with the handle shaft clamped therebetween at a user-selectable position therealong;

an elongated connector shaft having first and second ends;

means for pivotally mounting said connector shaft first end about an axis extending through at least one of said walls with said connector shaft second end extending beyond the handle grip and towards a user;

means for maintaining said pivotal shaft in a user selectable angular extension relative to the handle shaft and beyond said walls, said shaft second end of said connector shaft extending beyond the handle adapted for connection to a user.

15. The device as claimed in claim 14 further comprising:

a hook at said second shaft end;

a belt adapted to be worn about a waist of a user;

an eyelet on said belt for receiving said hook therein, said hook movable within said eyelet.

16. The device as claimed in claim 15 further comprising a latch adjacent said hook, said latch pivotal to a position to preclude separation of said hook from said eyelet.

17. The device as claimed in claim 14 further comprising:

a base extending from one of said walls for positioning on an underside of the handle shaft;

means on the other of said walls for engaging said other wall to said base.

18. The device as claimed in claim 14 further comprising:

a base extending from one of said walls;

at least one slot in said base;

a flange depending from the other of said walls for engagement with said at least one slot with the handle shaft between said walls.

19. The device as claimed in claim 18 further comprising a plurality of spaced-apart slots in said base, said flange engaging one of said slots according to a breadth of the handle shaft.

20. The device as claimed in claim 14 wherein said maintaining means comprises:

at least one aperture in one of said walls;

a flange on said shaft for engagement with said at least one wall aperture upon said connector shaft reaching a selectable degree of pivotal movement about said axis.

* * * * *